(12) United States Patent
Wray

(10) Patent No.: US 9,355,015 B2
(45) Date of Patent: May 31, 2016

(54) TECHNIQUE FOR SIMULATING AN ORIENTATION CHANGE EVENT IN A TEST ENVIRONMENT

(71) Applicant: COMPUWARE CORPORATION, Detroit, MI (US)

(72) Inventor: Nathan Wray, Troy, MI (US)

(73) Assignee: Dynatrace LLC, Detroit, MI (US)

(*) Notice: Subject to any disclaimer, the term of this patent is extended or adjusted under 35 U.S.C. 154(b) by 310 days.

(21) Appl. No.: 13/627,293

(22) Filed: Sep. 26, 2012

(65) Prior Publication Data
US 2014/0089904 A1    Mar. 27, 2014

(51) Int. Cl.
*G06F 17/30* (2006.01)
*G06F 3/041* (2006.01)
*G06F 11/36* (2006.01)
*G06F 11/34* (2006.01)

(52) U.S. Cl.
CPC ........ *G06F 11/3672* (2013.01); *G06F 11/3414* (2013.01); *G06F 2201/865* (2013.01)

(58) Field of Classification Search
CPC .......... G06F 17/30; G06F 11/36; G06F 3/041
See application file for complete search history.

(56) References Cited

U.S. PATENT DOCUMENTS

| | | | |
|---|---|---|---|
| 8,433,244 B2* | 4/2013 | Liu | 455/41.2 |
| 8,595,186 B1* | 11/2013 | Mandyam et al. | 707/632 |
| 8,612,884 B2* | 12/2013 | Capela et al. | 715/800 |
| 2002/0152159 A1* | 10/2002 | Khan | G06Q 20/10 705/39 |
| 2003/0051059 A1* | 3/2003 | Zondervan | G06F 17/30899 709/250 |
| 2008/0294383 A1* | 11/2008 | Parmar et al. | 702/186 |
| 2009/0100345 A1* | 4/2009 | Miller | 715/738 |
| 2011/0310041 A1* | 12/2011 | Williams | G06F 11/3696 345/173 |
| 2013/0196600 A1* | 8/2013 | Capers et al. | 455/41.2 |
| 2016/0026560 A1* | 1/2016 | Jackson | G06F 11/3688 714/38.1 |

OTHER PUBLICATIONS

Wikipedia, Title—"WebKit", pp. 1-9, Aug. 10, 2011.*
Title—"WebKit—Wikipedia", pp. 1-9, Aug. 10, 2011.*
The Screen Orientation API, www.w3.org, (May 22, 2012).

* cited by examiner

*Primary Examiner* — Chat Do
*Assistant Examiner* — Devayani R Talukdar
(74) *Attorney, Agent, or Firm* — Harness, Dickey & Pierce, P.L.C.

(57) ABSTRACT

A computer-implemented method is presented for simulating an orientation change on a computing device in a test environment. The method includes: retrieving an orientation action from a test script, the test script defined in accordance with a scripting language and the orientation action specifying an angle of rotation to simulate; setting a value of a window orientation variable in a web browser, the value of the window orientation variable correlating to the angle of rotation specified by the orientation action; issuing a resize command to a window resize function supported by the web browser; and issuing a change orientation event to a rendering engine associated with the web browser.

12 Claims, 6 Drawing Sheets

TECHNIQUE FOR SIMULATING AN ORIENTATION CHANGE EVENT IN A TEST ENVIRONMENT

FIELD

The present disclosure relates to techniques for simulating an orientation change event in a test environment.

BACKGROUND

Remote mobile monitoring solutions enable automated testing of applications running on mobile devices, such as mobile phone or tablet computers, or on server-class hardware where a mobile device environment is simulated. Monitor sites are set up at different geographic locations with each site hosting multiple mobile devices or mobile device simulation environments. Tests are scheduled to be executed in these simulation environments depending on various criteria including, network carrier, mobile device model, mobile device type, geographical location etc. The tests may be simple tests such as a "ping test" to test connectivity to a particular server or may be in the form of a test script that would drive an application running on the mobile device or in the simulation environment. Tests may be initiated by a controller remote from the monitor site and are typically executed by agents running on the mobile device or in the mobile device simulation environment. Statistics pertaining to the performance of the application are collected and reported back to the test controller.

Due to the cost and technological challenges of testing websites and mobile application on physical mobile devices, it is often desirable to implement the recording and playback of mobile test scripts on stationary mobile devices or in mobile device simulation environments. Such simulation environments present numerous drawbacks. For example, a stationary device is generally not capable of generating an orientation change event, which is caused by physical rotation of the mobile device. Alternatively, server-class hardware lacks the physical orientation change sensors employed on mobile devices. As a result, testing a websites or applications response to an orientation change event remains a problem.

This section provides background information related to the present disclosure which is not necessarily prior art.

SUMMARY

A computer-implemented method is presented for simulating an orientation change on a computing device in a test environment. The method includes: retrieving an orientation action from a test script, the test script defined in accordance with a scripting language and the orientation action specifying an angle of rotation to be simulated; setting a value of a window orientation variable in a web browser, the value of the window orientation variable correlating to the angle of rotation specified by the orientation action; issuing a resize command to a window resize function supported by the web browser; and issuing a change orientation event to a rendering engine associated with the web browser.

In another aspect, a computer-implemented method is presented for constructing the test script to simulate an orientation change. The method includes: launching a recorder on a computing device, where the recorder being implemented as a browser extension of a web browser; presenting a recording window on the computing device; displaying a web page in the recording window of the computing device; capturing events received from the web page displayed on the recording window; creating, a test script using the captured events, the test script defined in accordance with a scripting language; presenting a recorder interface window for the recorder on the computing device; receiving an orientation action from the recorder interface window, the orientation action specifying an angle of rotation to be simulated; and simulating, by the recorder, a change orientation event on the web page in response to the receipt of the orientation action.

In yet another aspect, a computer-implemented system is provided for simulating an orientation change on a computing device in a test environment. The system is comprised of a recorder, a recording window, and a recording interface window. The recorder is configured to capture events received from a web page under test and operates to record the captured events in a test script, where the test script defined in accordance with a scripting language. The recorder can be implemented as a browser extension of a web browser. The recording window displays the web page under test. The recording interface window is configured to receive an orientation action specifying an angle of rotation to be simulated on the web page and interfaced with the recorder to simulate the orientation action.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
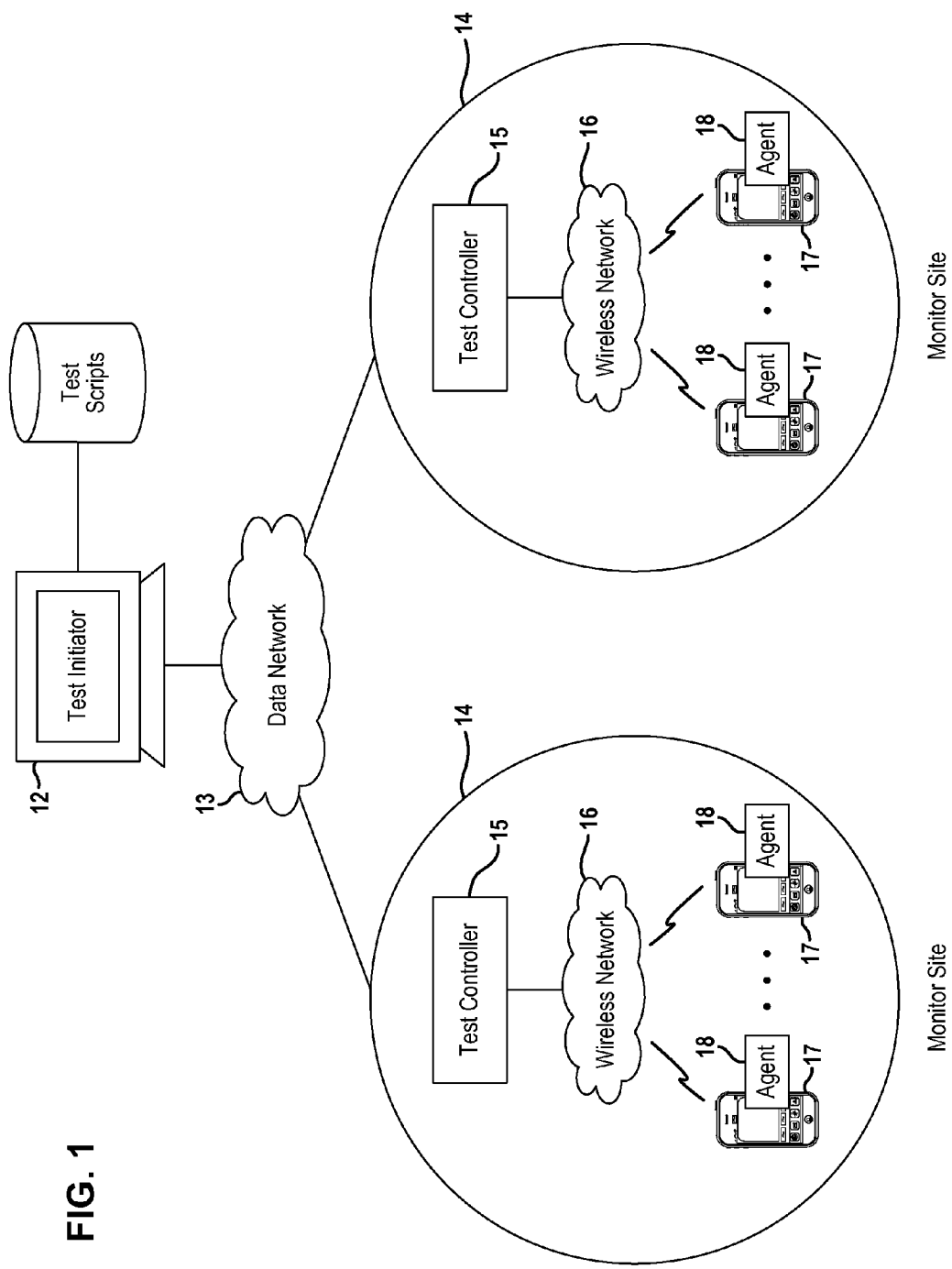
FIG. 1 is a diagram depicting an exemplary computer-implemented system that enables automated testing of mobile devices at one or more monitor sites.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an exemplary computer-implemented system 10 that enables automated testing of a plurality of mobile devices residing at one or more monitor sites 14. The system is comprised generally of a test initiator 12 interfaced via a data network 13 (e.g., the Internet) with one or more remote monitor sites 14. The test initiator 12 provides a front-end interface for initiating tests, controlling the devices under test and collecting test results from the devices under test. In an exemplary embodiment, the test initiator 12 may be implemented on a personal computer. Monitor sites 14 may be set up at disperse geographic locations depending on the testing requirements. A similar testing environment is the Gomez Synthetic Monitoring tool commercially available from Compuware Corporation. While the description set forth below makes reference to a distributed testing environment having stationary mobile device, it is readily understood that the testing environment may be implemented on one or more server devices residing at a single location.

Each monitor site 14 hosts a test controller 15 and a plurality of mobile devices 17. The test controller 15 operates to receive a test request from the test initiator 12 and transmit the test request to one or more of the mobile devices 17. During the course of the test, the test controller 15 may receive other commands or control notifications pertaining to the test from the test initiator 12, such as a command to interrupt or terminate the test as well as commands to install an application, uninstall an application, reboot an application, etc. These commands are also passed along asynchronously to the applicable mobile device 17. During the course of the test, mobile devices under test 17 may send notifications or messages asynchronously back to the test initiator 12. Likewise, these notifications may be sent to the test controller 15 which in turn forwards the notifications to the test initiator 12. Exemplary mobile devices may include but are not limited to mobile phones, tablet computers, and laptop computers.

Each mobile device 17 is configured with a test agent 18 (also referred to herein as a playback agent). The test agent 18 is generally responsible for carrying out or executing the test. In one exemplary embodiment, the test agent 18 is pre-configured to perform the steps of the test in response to a test request received from the test controller 15. In another embodiment, the test agent 18 executes steps for the test, where the steps are embodied in the test request received from the test controller 15. In yet another embodiment, the test agent 18 is configured to retrieve a test script upon receipt of the test request. The test script is retrieved from a repository 11 located remote from the monitor site 14, for example, at the site of the test initiator 12. In this case, the test agent 18 may retrieve the test script via the test controller 15 using a persistent data channel. Alternatively, the test agent 18 may retrieve the test script directly from the test initiator 12 using a secondary communication channel such as a WiFi or cellular link. In either case, the test agent performs the test by executing the retrieved test script. Other types of secondary data links are contemplated by this disclosure.

Figure 2:
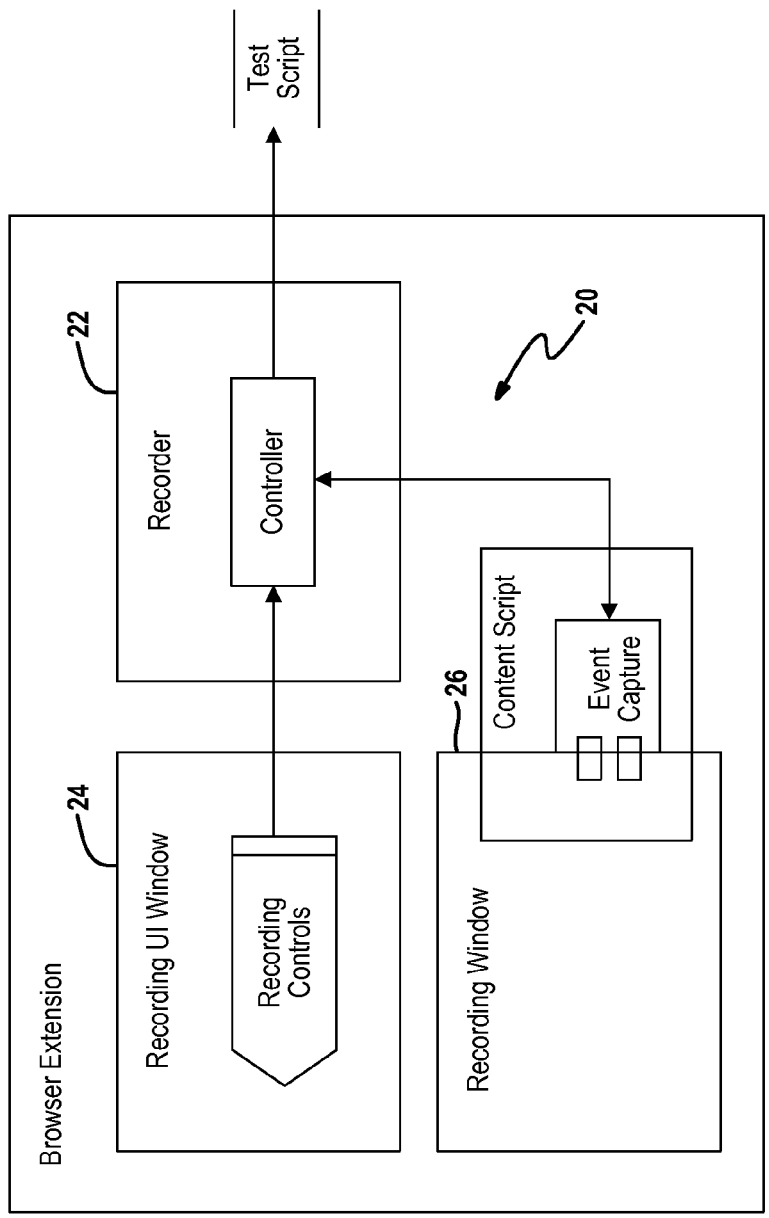
FIG. 2 is a diagram depicting an exemplary architectural arrangement for a test script development tool.

FIG. 2 depicts an exemplary architectural arrangement for a test script development tool 20. The arrangement is comprised generally of a recorder 22, a recorder user interface 24 and a recording window 26. Each of these components can be implemented on a single computing device. An exemplary test script development tool 20 is the Gomez Script Recorder commercially available from Compuware Corporation.

The recorder 22 enables a user to develop a test script for testing performance on a mobile device, for example, at a remote monitor site 14. In an exemplary embodiment, the recorder 22 is implemented as a browser extension of a web browser. More specifically, the recorder 22 may be implemented as a set of scripts HTML content and DLL extensions collectively referred to as the background page; as well as a set of scripts which are injected by the browser at runtime into the target page which are referred to as the content scripts of the browser extension to Google's Chrome web browser. The set of pages and scripts which comprise the background page are controlled by the background page or background entries in the extension's manifest.json file, or in the manifest values encapsulated by the Preferences file of the Chrome browser. The pages comprising the content scripts, as well as the control of which scripts should be injected and at which point in the load cycle they should be injected, are controlled by the content script and run at members of the manifest.json file or Chrome browser Preferences file. While the following description is provided with reference to the Chrome web browser environment, it is readily understood that the concepts disclosed herein may be extended to other types of web browsers and computing environments.

Prior to launching the recorder 22, the user may be prompted by the script development tool 20 to provide input regarding the target test environment. For example, the user may be prompted to specifying a website the user intends to interact with and the type of device being tested (e.g., an Apple iPhone or a Motorola Droid phone). The input is then used to launch the recorder 22. The recorder will first open a server socket on a port specified on the Chrome command line and will then wait for the script development tool to connect to this socket. This server socket is embodied by an NPAPI plugin incorporated into the extension by inclusion as a Windows DLL file and a reference to the plugin in the manifest.json or Preferences file, and finally by execution of JavaScript code in the recorder HTML and JavaScript. Once the script development tool has connected, the recorder will receive from the script development tool the relevant target test environment values as specified previously by the user. The recorder 22 will in turn launch the recorder user interface 24 as well as the recording window 26. These two windows may be displayed adjacent to each other on a display of the computing device hosting the script development tool 20.

During a recording session, the web page specified by the user is displayed on the recording window 26. As the user interacts with the web page, events generated by the user's interactions are captured by the recorder 22. The recorder 22 in turn uses the captured events to create a test script, where the test script is defined in accordance with a scripting language, such as JavaScript Object Notation or XML User Interface Language.

Figure 3:
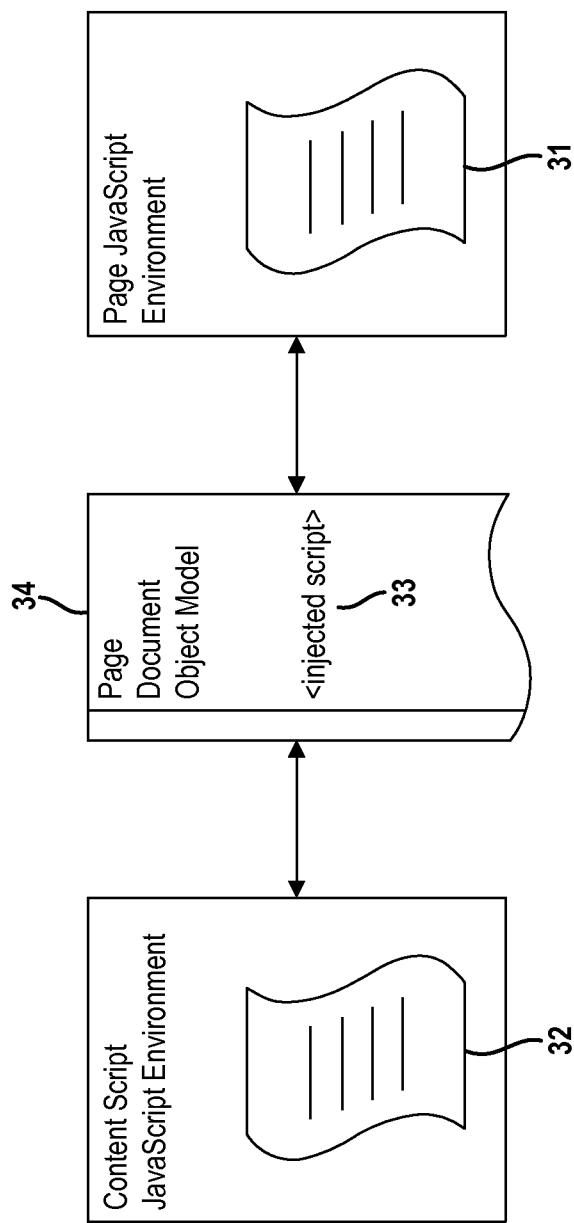
FIG. 3 is a diagram illustrating how to access variable defined by a web page using a shared document object model.

In the exemplary embodiment, a content script 32 running inside the web page registers with the browser to capture certain key events as they are raised by the browser in response to user interactions with the recording window. These events include but are not limited to mouse click events, mouse motion events, key press and release events, window size events, navigation events, and DOM modification events. As these events are captured by the content script, the captured events are relayed via a communications port through the background page to the recorder user interface 24. In the Chrome browser environment, the recorder content script 32 is kept separate from the script that is embedded in the page being recorded. With reference to FIG. 3, Chrome maintains two different JavaScript contexts: one for the script 31 that is included in the web page and one for the recorder content script 32. This means that the content script 32 cannot replace functions or variables in the JavaScript context of the web page. To address this issue, a new script node 33 is injected into the page document object model (DOM) 34 before the web page's JavaScript environment is created. This can be done by specifying that the web browser execute the context script at "document_start", which is before the DOM has been parsed and before the Page JavaScript environment exists. The content script 32 creates a new script node at 36 and appends it as a child of the HEAD element, ensuring that the Javascript specified in the newly-created node be executed before any script that exists in the target page. When the page's JavaScript context is created, the injected node 33 is executed in context of the web page as indicated at 37. This code can send and receive messages between the content script context and the page context by writing data into injected document nodes (since they can both see and modify the same DOM) or by dispatching synthetic page events (since both contexts see dispatched events). This allows the recorder to create or modify variables, structures and functions in the context of the target page's JavaScript environment. Similar techniques may be applicable to other web browser environments.

The recorder user interface 24 enables a user to simulate events which may not be supported in the test script development environment but are applicable to the device being tested. For example, the test script development tool 20 may be implemented on a computing device without a touchscreen interface while the device being tested may have a touchscreen. In this example, the user may desire to simulate touch events on the device being tested. In another example, the device being tested may be a mobile device which can be easily orientated in space and thereby change the content being displayed between a portrait mode and a landscape mode. For this example, the recorder user interface 24 enables the user to simulate a change orientation event as will be further described. Other types of simulated events may also be supported by the test script development tool.

Figure 4:
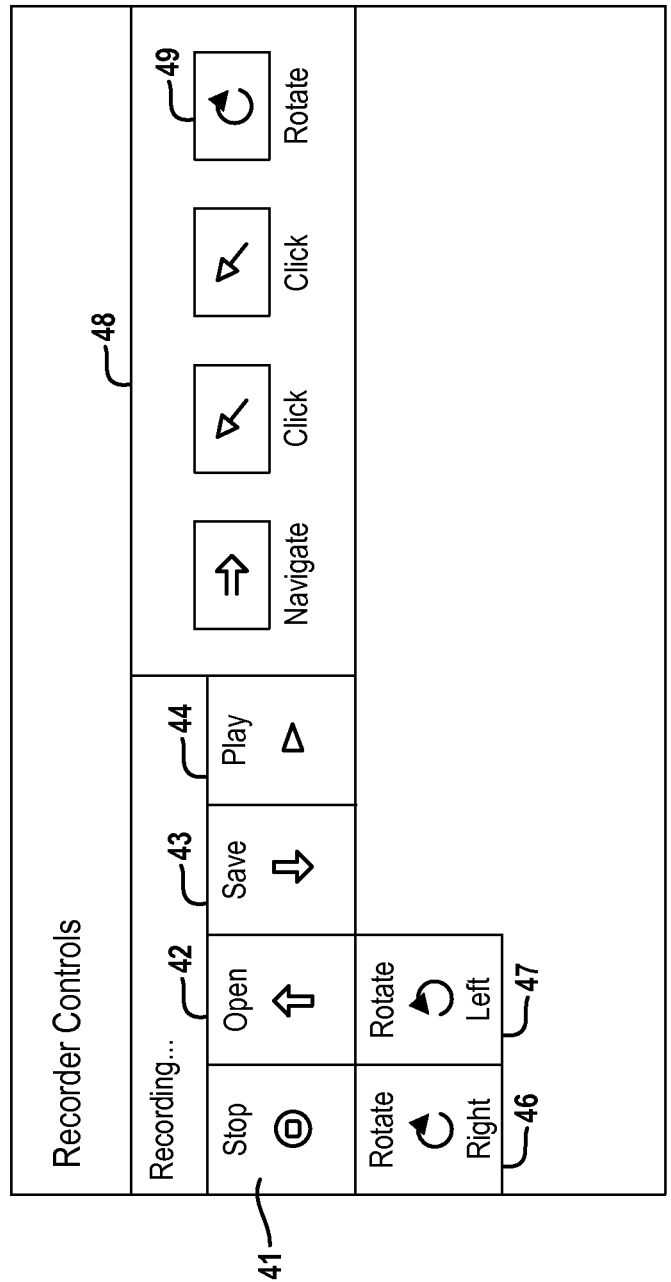
FIG. 4 is a diagram depicting an exemplary user interface for a recorder.

FIG. 4 depicts an exemplary embodiment of the recorder user interface 24. The recorder user interface 24 provides controls for controlling the recording session. For example, the recorder user interface 24 may include buttons that open a session 42, save a session 43, play a session 44 and stop a session 41. Moreover, the recorder user interface 24 provides an interface for simulating events which may not be supported in the test script development environment. Specifically, the recorder user interface 24 provides a rotate right (or clockwise) button 46 and a rotate left (or counterclockwise) button 47. In this example, the rotate right button 46 is used to simulate a mobile device being orientated in space by a predefined angle of rotation, for example 90 degrees. When a user clicks the rotate right button 46 a message is sent from the recorder user interface 24 to the recorder 22, where the message indicates the direction and amount of rotation for the orientation change. The recorder 22 in turn implements the requested change orientation action. In one embodiment, the recorder 22 sends a message to a content script as further described below. The recorder user interface 24 also includes a window 48 that displays the actions taken by the user when developing the test script. Each action taken by the user on the web page is captured by the recording window 26 and passed along via the recorder 22 for display in the window 48 of the recorder user interface 24. When user requests simulation of a particular action, such as an orientation change, the request action is also displayed in this window 48 as indicated at 49. In this way, the user can monitor the actions or events being added during the recording session by the recorder to the test script.

Figure 5:
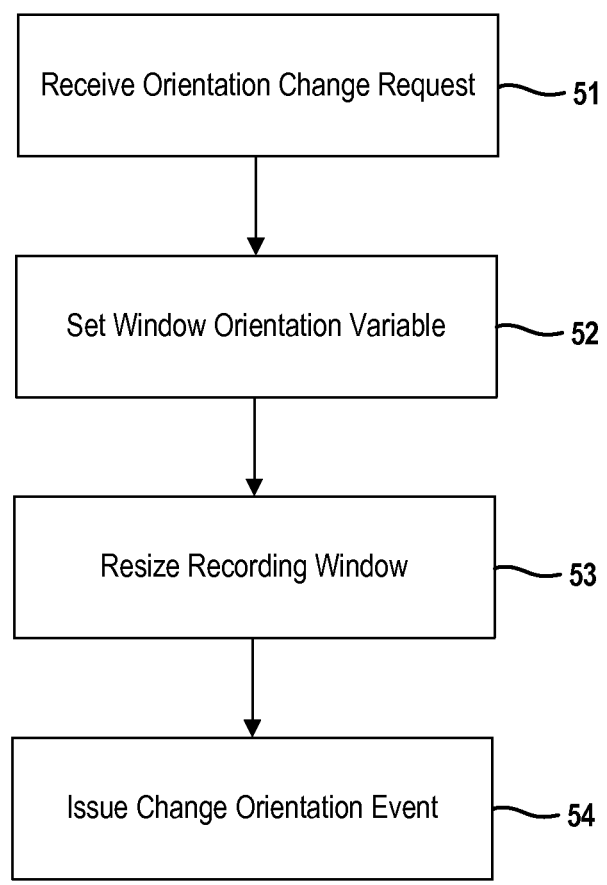
FIG. 5 is a flowchart depicting steps for simulating an orientation change in a test environment having a stationary device.

With reference to FIG. 5, an orientation change is simulated at 51 upon request by a person using the script development tool 20. In one embodiment, the user specifies that the rotation is in either the clockwise or counter-clockwise direction but the amount of rotation is presumed to be 90 degrees. In another embodiment, the user specifies both the direction of rotation and the amount of rotation. When a user clicks on a "change orientation" button, a message is sent from the recorder user interface 24 to the recorder 22, where the message indicates the direction and amount of rotation for the orientation change. Orientation changes can occur at any time during a recording session.

To implement the orientation change in the script development environment, the recorder 22 interfaces with the content script running inside the recording window 26. The content script passes messages, via manipulations of the shared DOM, to the injected JavaScript code running inside the page context. The injected code is in turn configured to implement the orientation change in the recording window 26. To do so, the content script will first set at 52 a value of a window orientation variable in the web browser (e.g., window.orientation in Chrome browser). By setting the window orientation variable, the recording window 26 will be rotated either clockwise or counterclockwise by a specified angle of rotation. In some embodiments, values for the angle of rotation may be selected from the group of {0, 90, 180 and -90} although other values are contemplated.

Next, the content script will issue a resize command at 53 to a window resize function supported by the web browser. In the exemplary embodiment, values for the current width (window.outerWidth) and height (window.outerHeight) of the recording window 26 will be swapped and passed to the window resize function (e.g., window.resizeTo(h,w) in Chrome browser). These values may be then adjusted to account for window margins, the presence or absence of scroll bars, or other factors which require the window dimensions to be asymmetrical between the landscape and portrait modes. In addition to resizing the recording window 26, this will cause a resize event to be raised by the web browser.

Lastly, the content script will dispatch at 54 a change orientation event to the rendering engine associated with the web browser. In exemplary embodiment, the event is sent to the event subsystem in the WebCore components of the WebKit rendering engine although other types of web browsers may be interfaced with other types of rendering engines. Exemplary pseudo code for simulating a change orientation event in this environment is below.

```
window.orientation = getNextOrientation( );
var w=window.outerWidth;
var h=window.outerHeight;
window.resizeTo(h,w);
// create and dispatch the event
var oe = document.createEvent ("Event");
oe.initEvent("orientationchange", false, false);
oe.cpwrSynthetic = true;
var result = window.dispatchEvent(oe);
```

Similar to any other event issued to the rendering engine, the change orientation event is captured by the recorder 22 and inserted into the test script. In this way, the orientation change is simulated in the recording window for the user as well as added to the test script being developed by the user.

In the event that an 'onorientationchange' method is defined on the window or the document.body, the content script will call this method as follows.

```
// execute the registered functions, if any
if (typeof window.onorientationchange === 'function') {
    window.onorientationchange( );
}
if (typeof document.body.onorientationchange === 'function') {
    document.body.onorientationchange( );
}
```

Figure 6:
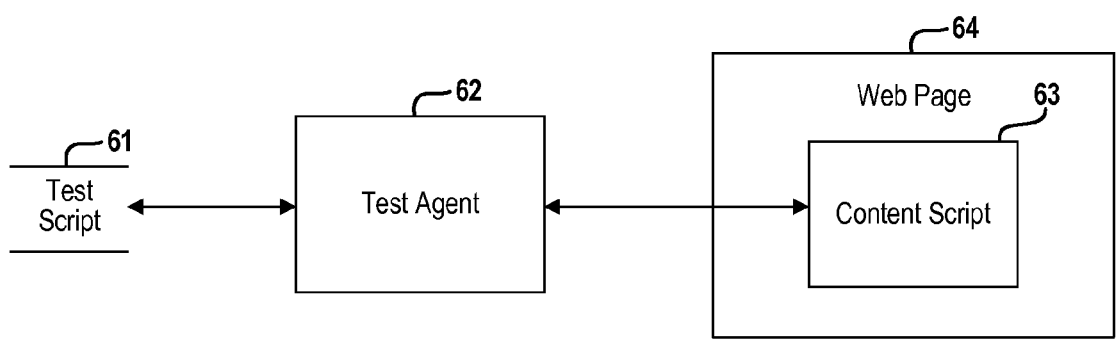
FIG. 6 is a diagram depicting an exemplary architectural arrangement on a mobile device being tested at a monitor site.

FIG. 6 depicts an exemplary architectural arrangement for simulating an orientation change on a computing device in a test environment. Rather than being driven by a user, the test agent or playback agent 62 is driven by a test script 61 which has been previously recorded using, for example, the test script development tool 20. The test agent 62 may be implemented in a similar manner as the recorder 22. That is, the test agent 62 may be implemented as a browser extension to the web browser. In one embodiment, the test agent 62 is an extension of Google's Chrome web browser and resides on a desktop computer. In another embodiment, the test agent 62 is an extension to a web browser residing on a mobile device 17 in the test environment described in FIG. 1. It is readily understood that mobile versions of web browsers, including the Chrome web browser, may be configured to support browser extensions.

During testing, the test agent 62 retrieves actions from the test script 61 and coordinates execution of actions on the mobile device accordingly. When the test agent 62 retrieves an action that calls for the execution of an orientation action, the test agent 62 will send a message to a content script 63 running inside the target web page 64. The content script operates in a similar manner as described above in relation to the recording process. That is, the content script will first set a value of a window orientation variable in the web browser setting, where the value of the window orientation variable correlates to the angle of rotation specified by the change orientation event received from the test script. The content script will issue a resize command to a window resize function supported by the web browser and dispatch a change orientation event to the rendering engine associated with the web browser.

Prior to executing a test script 61, it may be necessary for the test agent 62 to configure the testing environment. As it pertains to simulating orientation changes, the test agent 62 may need to, for example, create an orientation change event object and associated variables in the web browser. In an exemplary embodiment, the test agent 62 instantiates an event object (i.e., orientation change object) from an event object superclass in Javascript and adds the applicable variables pertaining to the orientation change event to the object. The content script will then be able to access, for example, the window orientation variable when simulating a change orientation event.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented automated method for simulating an orientation change between portrait mode and landscape mode and collecting test results, in real-time, on a computing device in a distributed test environment, comprising:
   implementing a playback agent as a browser extension of a web browser residing on the computing device;
   configuring, by the playback agent, a test environment of the computing device, including instantiating an orientation change event object from an event object superclass, where the orientation change event object has methods that handle change orientation events;

executing a test script in the test environment to test an application on the computing device;

retrieving, by the playback agent, an orientation action from the test script, the test script defined in accordance with a scripting language and the orientation action specifying an angle of rotation for entire content in a given window displayed on the computing device;

setting, by a content script interfaced with the playback agent, a value of a window orientation variable in a web browser, where the window orientation variable defines an angle of rotation for content in the given window and the value of the window orientation variable correlating to the angle of rotation specified by the orientation action;

issuing, by the content script interfaced with the playback agent, a resize command to a window resize function supported by the web browser, where the window resize function adjusts dimensions of the given window; and dispatching, by the content script interfaced with playback agent, a change orientation event to a rendering engine associated with the web browser and coordinating execution of actions on the computing device, where the change orientation event includes the window orientation variable, the content script executes in the webpage, and the playback agent is executed by a processor of the computing device.

2. The method of claim 1 further comprises retrieving, by the playback agent, another event from the test script, where the another event differs from the change orientation event; and dispatching, by the playback agent, the another event directly to the rendering engine associated with the web browser.

3. The method of claim 1 wherein dispatching a change orientation event further dispatching the change orientation event to the orientation change event object.

4. The method of claim 1 further comprise implementing the web browser as Google Chrome and implementing the rendering engine as a WebKit layout engine.

5. A non-transitory computer readable medium having instructions stored thereon that, when executed by a computer processor, cause the processor to simulate an automated orientation change between portrait mode and landscape mode and vice versa on a computing device in a distributed test environment, comprising:

launching a recorder on a computing device, the recorder being implemented as a browser extension of a web browser and executed by a processor residing on the computing device;

presenting, by the recorder, a recording window on the computing device;

displaying a web page in the recording window of the computing device;

injecting, by a content script, a script node into a document object model for the web page, where the content script runs in the web page;

capturing, by the recorder, events received from the web page displayed on the recording window;

creating, by the recorder, a test script using the captured events, the test script defined in accordance with a scripting language;

presenting, by the recorder, a recorder interface window for the recorder on the computing device, the recorder interface window configured to receive actions to be simulated on the web page;

receiving, by the recorder, an orientation action from the recorder interface window, the orientation action specifying an angle of rotation for entire content in a given window displayed on the computing device, where the orientation action can occur at any time during a recording session; and simulating, by the recorder, a change orientation event on the web page by setting a value of a window orientation variable in the web browser, where the window orientation variable defines an angle of rotation for content in the given window;

issuing a resize command to a window resize function supported by the web browser, where the window resize function adjusts dimensions of the given window; and dispatching a change orientation event to a rendering engine associated with the web browser, where the change orientation event include the window orientation variable and the value of the window orientation variable is set to the angle of rotation specified by the orientation action, wherein the simulation of the change orientation event uses the script node and is in response to the receipt of the orientation action.

6. The method of claim 5 further comprises recording the change orientation event in the test script.

7. The method of claim 6 further comprises implementing the recorder interface window as a browser extension of the web browser residing on the computing device.

8. The method of claim 7 further comprise defining the web browser as Google Chrome and defining the rendering engine as a WebKit layout engine.

9. A computer-implemented system for simulating an automated orientation change between portrait mode and landscape mode or vice versa, in real-time, on a computing device in a distributed test environment, comprising:

a computer processor residing on the computing device;

a recorder configured to capture events received from a web page under test and operable to record the captured events in a test script, the test script defined in accordance with a scripting language, where the recorder is a browser extension of a web browser and initiates a content script that executes in the context of the web page under test and the recorder is executed by the computer processor;

a recording window operable to display the web page under test;

a recording interface window configured to receive an orientation action specifying an angle of rotation for content in a given window to be simulated on the web page and interfaced with the content script, wherein the content script simulate the orientation action by setting a value of a window orientation variable in the web browser, issues a resize command to a window resize function supported by the web browser, and dispatches a change orientation event to a rendering engine associated with the web browser, where the window orientation variable defines an angle of rotation for content in the given window and value of the window orientation variable is set to the angle of rotation specified by the orientation action and the change orientation event includes the window orientation variable, wherein the recording window and the recording window interface are executed by the computer processor.

10. The computer-implemented system of claim 9 wherein the recorder interface window is a browser extension of the web browser residing on the computing device.

11. The computer-implemented system of claim 9 wherein the content script injects a script node into a document object model for the webpage.

12. The computer-implemented system of claim 9 wherein the web browser is Google Chrome and the rendering engine is a WebKit layout engine.

\* \* \* \* \*